United States Patent [19]

Warszawski et al.

[11] Patent Number: 4,590,135
[45] Date of Patent: May 20, 1986

[54] FUEL CELL STRUCTURES

[75] Inventors: Bernard Warszawski, Paris; Pierre Fauvel, Limours; Sylvain Dupré, Chilly Mazarin, all of France

[73] Assignee: Occidental Chemical Corporation, New York, N.Y.

[21] Appl. No.: 733,028

[22] Filed: May 13, 1985

[30] Foreign Application Priority Data

May 11, 1984 [FR] France .................. 84 07314

[51] Int. Cl.$^4$ .................... H01M 8/24
[52] U.S. Cl. .................... 429/38; 429/39
[58] Field of Search .......... 429/37, 38, 39, 36, 429/35, 18

[56] References Cited

U.S. PATENT DOCUMENTS

| | | | |
|---|---|---|---|
| 3,489,614 | 1/1970 | Tomter | 429/38 |
| 3,530,005 | 9/1970 | Leonard | 429/39 |
| 3,666,561 | 5/1972 | Chiku | 429/18 |
| 3,690,954 | 9/1972 | Warszawski et al. | 429/39 |
| 3,717,505 | 2/1973 | Unkle et al. | 136/86 A |
| 3,814,631 | 6/1974 | Warszawski et al. | 429/39 |
| 3,833,424 | 9/1974 | Lowis et al. | 429/38 |
| 3,871,922 | 3/1975 | Bohm et al. | 136/120 FC |
| 4,124,478 | 11/1978 | Tsien et al. | 429/39 |
| 4,210,512 | 7/1980 | Lawrance et al. | 429/38 |
| 4,214,969 | 7/1980 | Lawrance et al. | 429/38 |

FOREIGN PATENT DOCUMENTS 0101240  2/1984  European Pat. Off. .

Primary Examiner—Donald L. Walton
Attorney, Agent, or Firm—Sughrue, Mion, Zinn Macpeak & Seas

[57] ABSTRACT

The fuel cell structure is constituted by a plurality of cells disposed in electrical contact with one another, each cell comprising two porous electrodes, an electrolyte filling the gap between the said electrodes, and two impermeable bipolar current collectors. One of the electrodes (2) is pressed against a frame (3) having a central orifice (4). One face of the said frame (3) includes grooves (11) for conveying electrolyte from an inlet orifice (8A) to a distribution manifold (12) which is in communication with the electrolyte compartment, and also for conveying electrolyte from the central compartment to an outlet orifice (8B). The electrolyte conveying network on the frame (3) is sealed by means of a second frame (55) made of insulating material and pressed over the said network. The frames are fixed together.

8 Claims, 14 Drawing Figures

FUEL CELL STRUCTURES

FIELD OF THE INVENTION

The invention relates to improvements in fuel cell structures constituted by a plurality of cells disposed in electrical contact with one another, each cell comprising:

first and second porous electrodes which are preferably plane in shape with parallel faces, one being a cathode and the other an anode, and each including a specific catalyst;

an electrolyte filling the gap situated between the said electrodes; and two impermeable bipolar current collectors, including at least a central conductive zone having channels on each face of the said collectors, a first collector coming into electrical contact via the high points of its cathode face with the external surface of the said cathode, and via its anode face with the external surface of the anode of an adjacent cell, and a second collector coming into electrical contact via the high points of its anode face with the external surface of the said anode, and via its cathode face with the cathode of the other adjacent cell, an oxidizing gas flowing between the said cathode and the cathode face of the first collector, and a fuel gas flowing between the said anode and the anode face of the second collector, the top and bottom parts of the said collectors situated on either side of the central conductive zones being provided with orifices to allow the electrolyte and the fuel to flow through the cell structure, the first electrode being pressed against a frame preferably made of insulating plastic material and having a central orifice in the shape of a quadrilateral, the bottom and top portions of the said frame including orifices for conveying fuel and electrolyte through the cell structure, said orifices corresponding to the orifices provided in the collectors, means being provided on one face of the said frame to enable electrolyte to be conveyed from one of the said electrolyte-conveying orifices, referred to as an inlet orifice, to an electrolyte compartment situated between the two electrodes, and from the said compartment to another electrolyte-conveying orifice, referred to as an outlet orifice, the said means including grooves that open out into hollow portions that constitute electrolyte distributing and collecting manifolds disposed on the top and bottom portions of the frame along two opposite sides of the central orifice and in communication with the electrolyte chamber by means of a plurality of parallel microchannels delimited by ribs.

BACKGROUND OF THE INVENTION

In such cells, the electrolyte distribution network which comprises the grooves, the manifolds and the microchannels in the frames may be sealed by pressing the second electrode pressing against the face of the frame in which said electrolyte distribution network is made and in making the electrode large enough to cover the network, with sealing being established during assembly by clamping together the various components.

However, it has been observed that this solution is not satisfactory when the electrolyte flows permanently and is distributed in parallel to all of the cells, since the electrolyte can then give rise to shunt currents (and thus to high energy losses) by virtue of electrolyte common to the different cells coming into contact with the various sealing electrodes as it flows through channels defined in the assembled cell structure by co-operating orifices provided in the different components.

Preferred embodiments of the present invention remedy such drawbacks.

SUMMARY OF THE INVENTION

The present invention provides a fuel cell structure of the above-defined type including a second frame, preferably made of an insulating plastic material, having the same contour as the first frame against which the first electrode is pressed and having electrolyte and fuel conveying orifices corresponding to those provided in the said first frame, said second frame being applied by a plane face on the face of the first frame having the grooves and the distributing and collecting manifolds, and being fixed to said first frame in such a manner as to seal the electrolyte distribution network, the second electrode being pressed against the other face of the second frame, and the electrolyte compartment then being defined by the electrodes and the central orifices of the two frames.

In a particular embodiment of the invention the face of the second frame against which the second electrode is pressed preferably includes a set-back portion adjacent to the central orifice and of substantially the same depth as the thickness of the said second electrode whereby the said second electrode does not stand proud of the face of the second frame after being pressed thereagainst, and the face of the first frame against which the first electrode is pressed preferably likewise includes a set-back portion adjacent to the central orifice and of substantially the same depth as the thickness of the said first electrode whereby the said first electrode does not stand proud of the face of the first frame after being pressed thereagainst.

In one implementation, the grooves in the first frame connecting the inlet and outlet orifices to the distributing and collecting manifolds are U-shaped, with the bottoms of the Us being situated on the opposite sides of the central electrolyte-compartment-delimiting orifice relative to the said inlet and outlet orifices.

Advantageously, the bottoms of the grooves and the distributing and collecting manifolds include means such as studs or ribs which rise to the level of the plane of the face of the frame and which serve to keep the said second frame properly spaced from the said bottoms when the frames are applied against each other.

BRIEF DESCRIPTION OF THE DRAWINGS

Embodiments of the invention are described by way of example with reference to the accompanying drawings, in which.

MORE DETAILED DESCRIPTION

Figure 1:
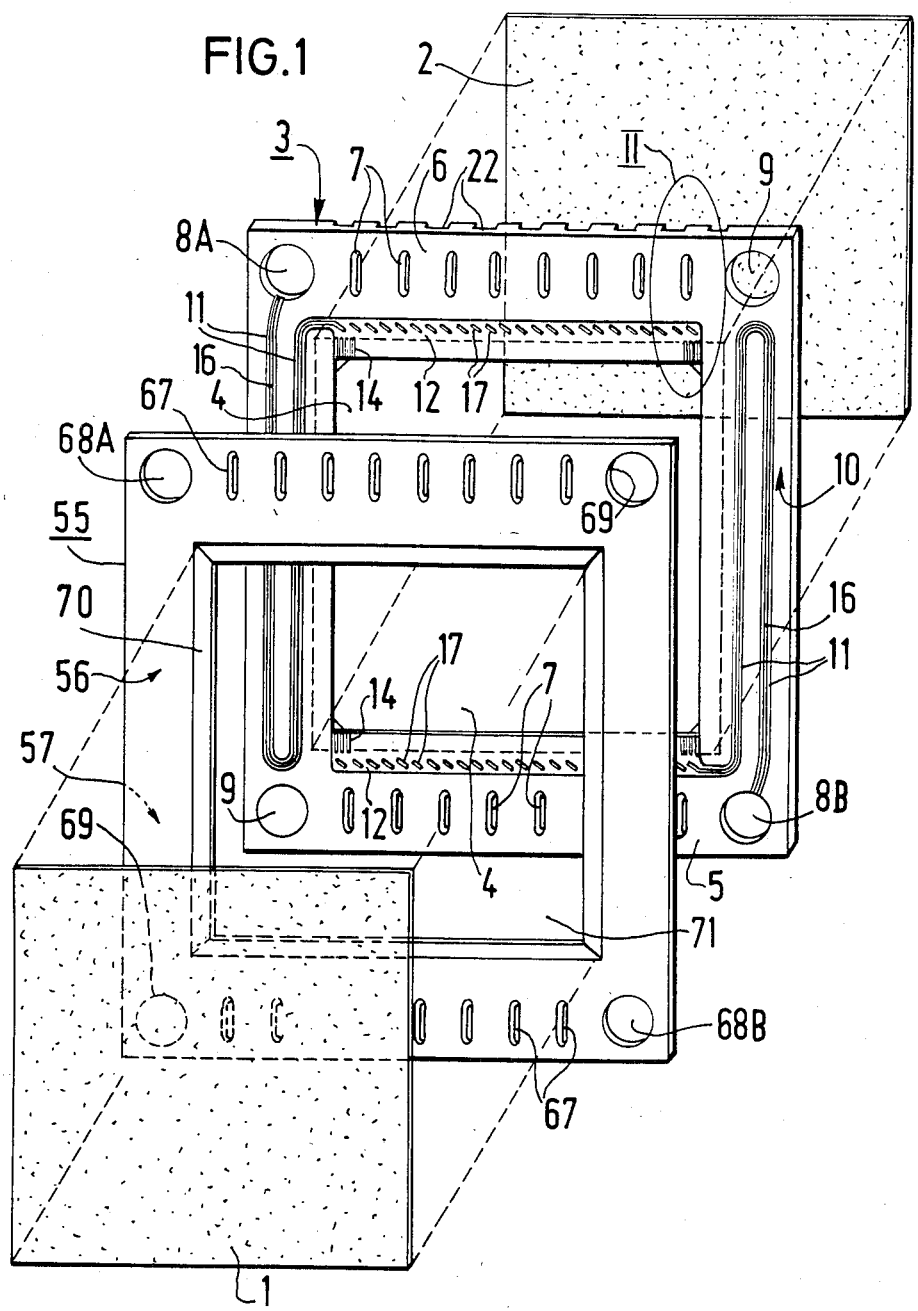
FIG. 1 is an exploded view of several of the components of a cell in a fuel cell structure in accordance with the invention.

In the figures, reference numerals 1 and 2 designate porous electrodes forming part of a cell in a fuel cell structure in accordance with the invention.

In the embodiment described and shown the anode is designated by reference numeral 1 and has one face in contact with the electrolyte and its other face in contact with a fuel gas, while the cathode is designated by the reference numeral 2 and has one face in contact with the electrolyte and its other face in contact with an oxidizing gas.

These electrodes may be made of carbon or graphite together with a plastic material such as polytetrafluoroethylene for example, and each electrode includes a specific catalyst.

By way of example only, the electrodes may be of flexible structure as described in French Pat. No. 79 25 879 of Oct. 18, 1979 (equivalent to U.S. Pat. No. 4,317,867). They may be made, in particular, by the methods described in French Pat. Nos. 79 25 877 and 79 25 878 likewise filed Oct. 18, 1979 (equivalent to U.S. Pat. No. 4,317,789 and to Canadian Pat. No. 1 139 833 respectively).

In the example shown, the cathode 2 is pressed against a frame 3 having a central orifice in the shape of a quadrilateral.

The frame 3 is advantageously made of an insulating plastic material such as polypropylene, polyvinyl chloride (PVC), acrylonitrile butadiene styrene (ABS), polyethylene, polystyrene, polysulphones, . . . .

It may be about 0.2 mm to 5 mm thick and is preferably 0.5 mm to 1.5 mm thick.

In the example shown, the central orifice 4 is square.

The bottom and top portions 5 and 6 respectively of the frame 3 are provided with orifices for conveying fuel and electrolyte through the fuel cell structure.

Reference 7 designates orifices for fuel flow, and the example shown they are oblong.

Orifice 8A serves to convey electrolyte through the fuel cell structure and as an inlet for conveying electrolyte into the electrolyte compartment.

Orifice 8B serves to convey electrolyte through the fuel cell structure and as an outlet for evacuating electrolyte from from the electrolyte compartment.

Reference 9 designates orifices for use in centering the components during assembly and/or for passing clamping bars.

Means are provided on the face 10 of the frame 3 for conveying electrolyte from the inlet orifice 8A to the electrolyte compartment, and from the electrolyte compartment to the outlet orifice 8B.

Figure 2:
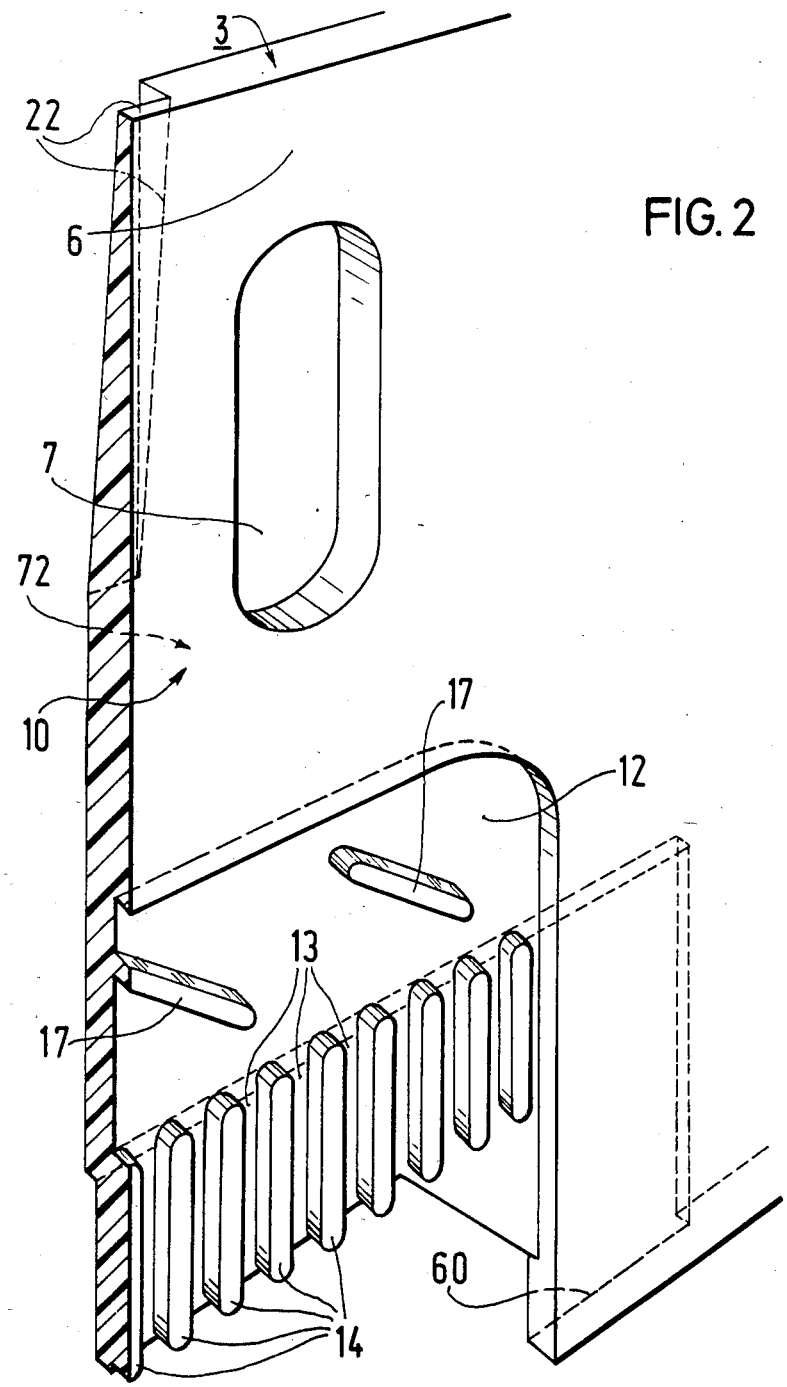
FIG. 2 is a perspective view on a larger scale of a portion or detail II in FIG. 1.

These means comprise grooves 11 leading to hollowed out portions 12 constituting electrolyte distributing and collecting manifolds disposed at the bottom and top portions 5 and 6 of the frame 3 along two opposite sides of the central orifice and communicating with the electrolyte compartment by means of a plurality of parallel microchannels 13 delimited by ribs 14 as can be seen in FIG. 2.

The tops of the ribs 14 are in the same plane as the face 10 of the frame 3.

Preferably the grooves 11 follow an elongate path and are of small section. It is important to lengthen the path and to reduce the section of the electrolyte between the electrolyte compartment and the inlet and outlet orifices in cell structures in which the electrolyte is distributed to the cells in parallel in order to raise the shunt resistance between cells and to reduce energy losses as much as possible. Further, conveying the electrolyte via small section channels of considerable length ensures a high and well-defined head loss in comparison to the head loss through the electrolyte compartments, thereby ensuring uniform distribution and flow of the electrolyte through the different cells of the structure.

In the example shown, the grooves 11 follow a U-shaped path with the bottom of the U being situated on the opposite side of the electrolyte compartment delimiting central compartment 4 relative to the corresponding orifice 8A or 8B.

This U-shape doubles the path length without significantly increasing the size of the components. It also enables:

the flow of electrolyte to be interrupted, if so desired, while keeping the compartment full; and the electrolyte to be caused to flow from bottom to top of the compartment, if so desired, without running the risk of emptying the compartment in the event of an accidental leakage of gas therein.

By way of example, each side of the U may be as long as the height of the electrolyte compartment, with the width of the groove lying in the range 0.5 mm to 10 mm.

The electrolyte distribution network, comprising the grooves 11, the manifolds 12 and the microchannels 13, is sealed by means of a second frame 55 of insulating plastic material and extending at least over the said distribution network, the said frame 55 being fixed to the frame 3.

In the example shown, the frame 55 has a similar perimeter to that of the frame 3, in particular it has orifices 67, 68A, 68B and 69 which correspond to the orifices 7, 8A, 8B and 9 respectively in the frame. The frame 55 also has a central orifice 71 corresponding to the central orifice 4 of the frame 3. The thickness of the frame 55 may lie in the range 0.1 mm to 5 mm and preferably lies in the range 0.3 mm to 0.6 mm. It is advantageously made of the material as the frame 3.

The frame 55 may be fixed to the frame 3 by any suitable means, eg. gluing or welding.

The bottoms of the grooves 11 and of the electrolyte distributing and collecting manifolds 12 include means such as studs or ribs which rise to the level of the plane of the face of the frame and which serve to keep the second frame 55 off the said bottoms and to make fluid supply more regular. Thus, in the example shown, a rib 16 is provided along the entire length of each groove 11.

Further, the manifolds 12 include a plurality of ribs 17 disposed in parallel and oriented not to hinder electrolyte flow.

The tops of the ribs 16 and 17 lie in the same plane as the face 10 of the frame 3.

Using ribs instead of studs reduces the risks of perforating the frame 55.

The anode 1 is pressed against the frame 55.

The electrolyte compartment 64 is defined by the two electrodes 1 and 2 and by the frames 3 and 55. A separator constituted for example by an embossed porous sheet may be disposed inside the compartment 64.

On its face 72 opposite to its face 10, the portion of the frame 3 which delimits the central orifice 4 and against which the cathode 2 is pressed includes a set-back 60 for receiving the cathode 2 in such a manner that the cathode does not stand proud of the rest of the face 72 after the assembly has been pressed together.

However, the there is no such set-back around the central orifice of the face 10 of the frame 3 since it does not support an electrode but rather it engages the other frame 55.

This structure is particularly visible in FIG. 2 where it can also be seen that the ribs 14 which delimit the microchannels 13 rise to be flush with the plane of the face 10 of the frame 3. The same is true of the ribs 16 and 17.

Figure 3:
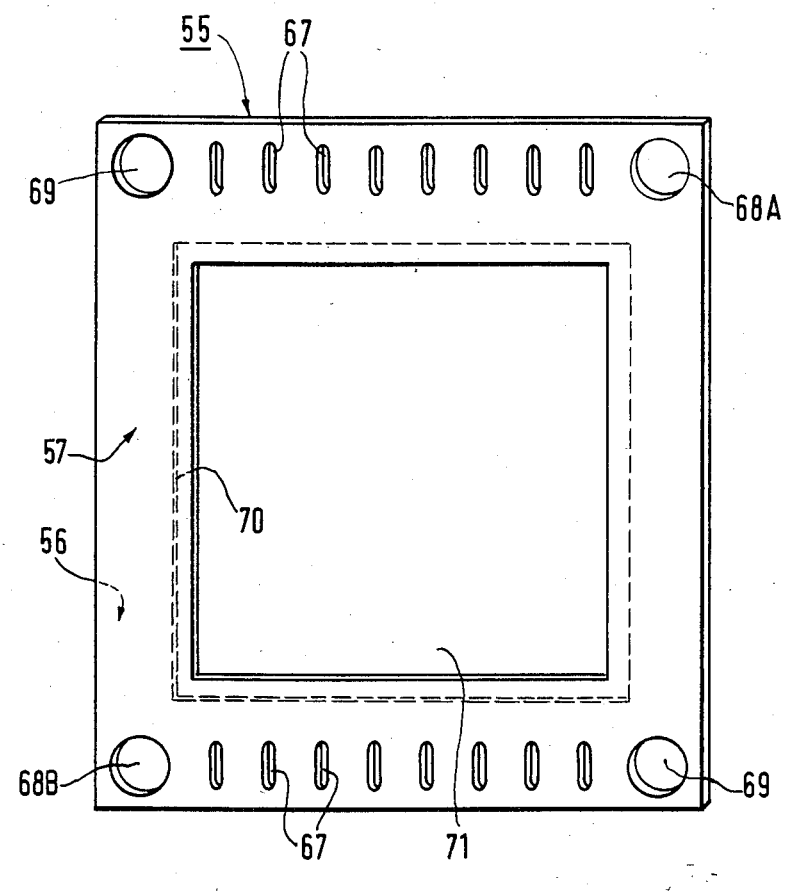
FIG. 3 is a view of the other face of one of the components shown in FIG. 1.

FIG. 3 shows the opposite face 57 of the frame 55 to the face 56 shown in FIG. 1. The face 57 engages the face 10 of the frame 3 in which the electrolyte distribution network is formed, and does not have a set-back portion.

However, the other face 56 of the frame 55 against which the anode 1 is pressed does have a set-back portion 70 around the central orifice for receiving the anode 1 in such a manner that in the assembled cell, the anode 1 does not stand proud of the remainder of the face 56.

Figure 4:
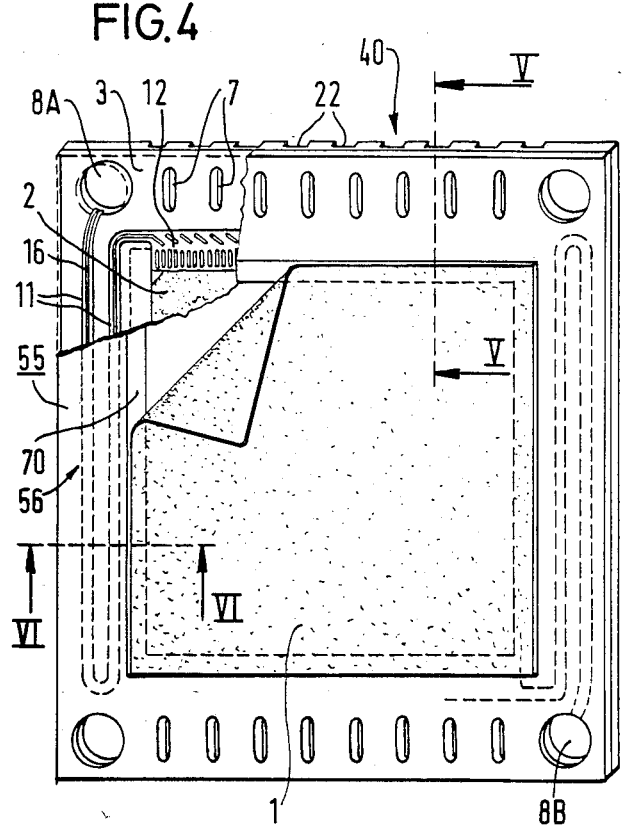
FIG. 4 is a front view of a cell constituted by assembling the various components shown in FIG. 1, with some of the components shown folded back and partially cut-away.
Figure 5:
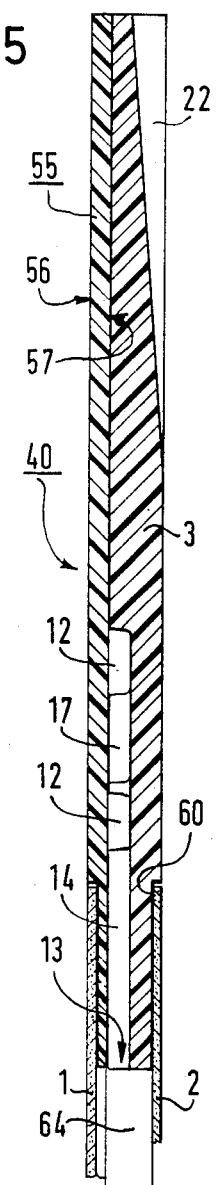
FIG. 5 is a section on a larger scale on a line V—V of FIG. 4.
Figure 6:
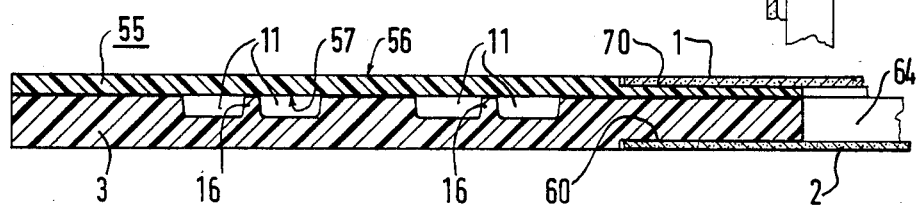
FIG. 6 is a section on a larger scale on a line VI—VI of FIG. 4.
Figure 7:
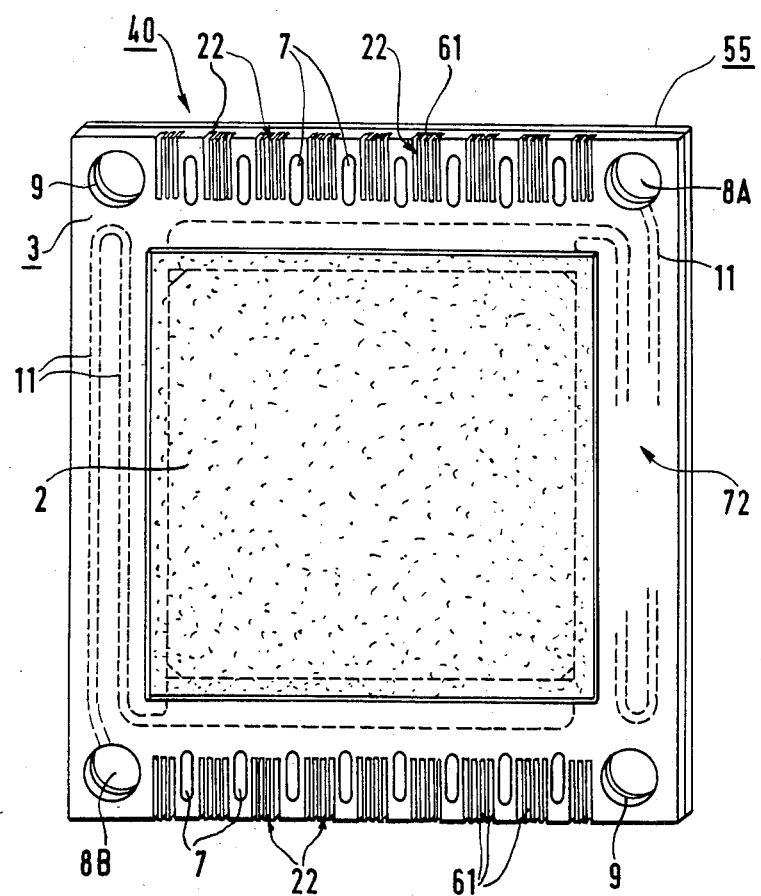
FIG. 7 is a view of the other face of the cell shown in FIG. 4.
Figure 9:
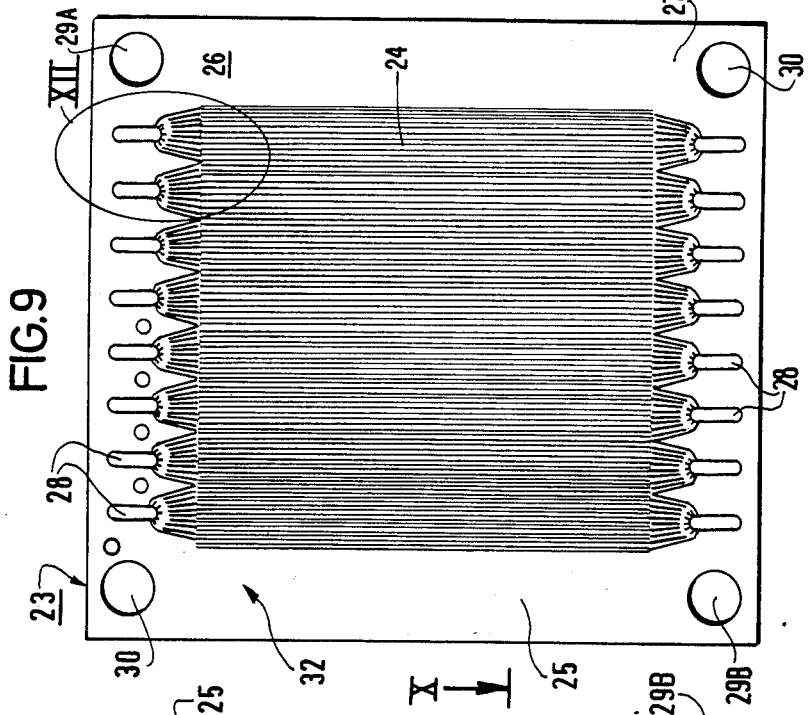
FIG. 9 is a view of the other face of the FIG. 8 current collector.
Figure 8:
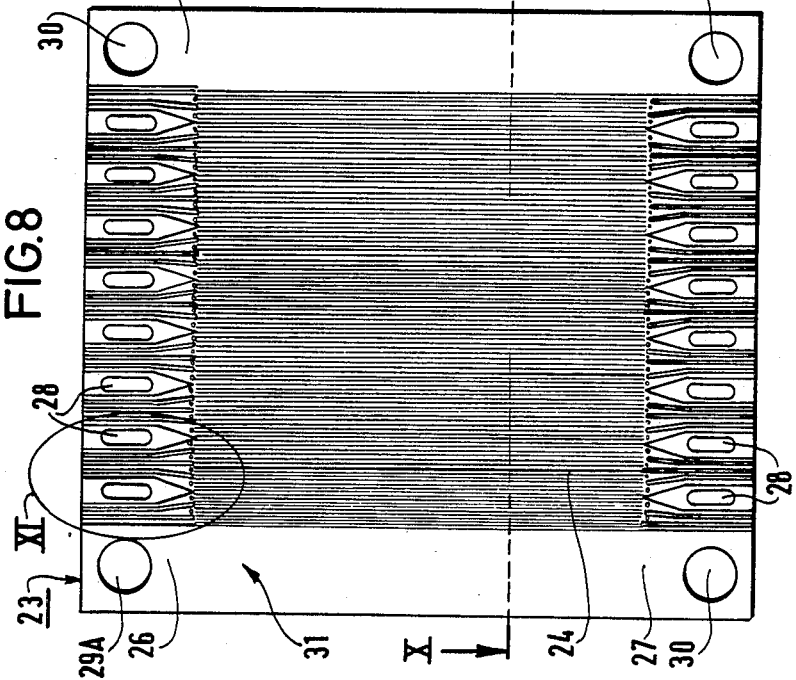
FIG. 8 is a view of one face of a bipolar current collector.
Figure 10:
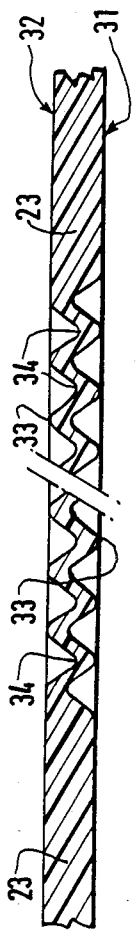
FIG. 10 is a section on a larger scale of a portion of the current collector on a line X—X in FIG. 8.

FIGS. 4, 5, 6 and 7 relate to the cell 40 constituted by assembling the various components shown in FIG. 1, i.e. the electrodes 1 and 2, and the frames 3 and 55. FIG. 4 shows the face of the cell which is fed with fuel, while FIG. 7 shows the face which is fed with oxidant.

In FIG. 7, it can be seen that the bottom and top portions of the frame 3 includes notches 22 located between the orifices 7 for co-operating with the corresponding grooves or hollows provided in the current collectors to increase the inlet and outlet sections for the oxidant. The notches 22 can also be seen in FIGS. 1 and 2. As shown in FIG. 7, longitudinal ribs 61 may be included in the notches 22 to delimit vertical channels.

FIGS. 8 to 12 relate to the current collectors. They are impermeable bipolar collectors including at least a central conductive zone including channels on each of the faces of the said collectors, with the bottom and top portions of the said collectors situated on either side of the said central conductive zone being provided with orifices for the flow of electrolyte and fuel through the cell structure.

In the example shown, the current collectors are designated by reference 23. They include a central conductive zone 24 of the same shape as the electrodes 1 and 2 surrounded by a peripheral insulating zone 25. The top and bottom portions 26 and 27 of the insulating zone 25 include orifices 28, 29A, 29B and 30 which correspond respectively to the orifices 7, 8A, 8B and 9.

On each of the faces 31 and 32 of the current collectors, the central conductive zone is provided with generally vertical splines defining channels for gas flow.

Figure 12:
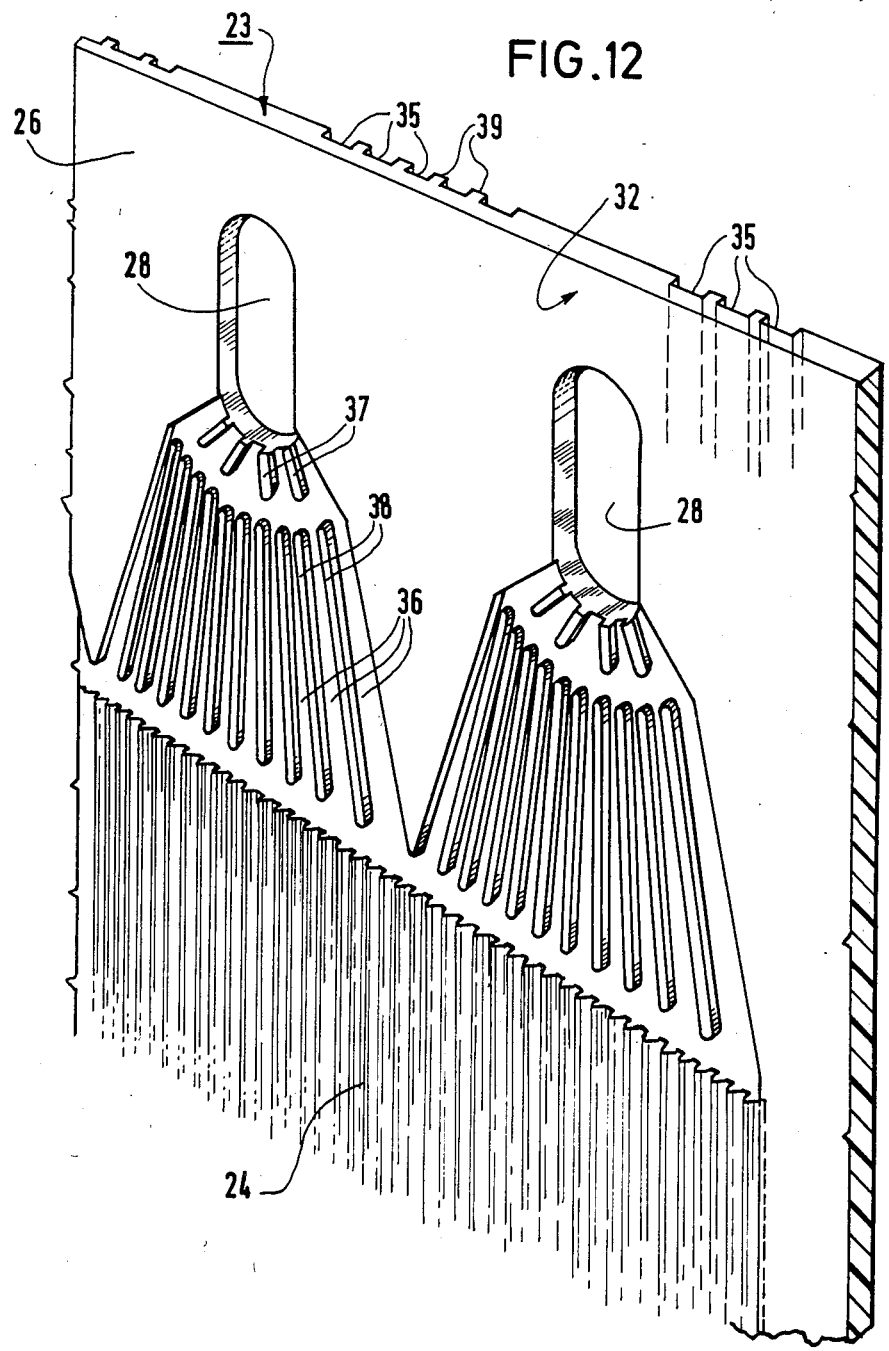
FIG. 12 is a perspective view on a larger scale of a portion or detail XII of FIG. 9.

In the example shown, the splines 33 are vertical and define channels 34 which are likewise vertical. The network of splines and channels may be obtained by corrugating a sheet as shown in FIG. 12, but it is also possible for the sheet to have a plane central core with matching projecting splines on either side thereof. The sheet may be 50 microns to 3 mm thick, and is preferably 0.1 mm to 0.5 mm thick.

It is also possible to use zig-zag splines instead of vertical splines, or splines of any other shape. The pitch and the height of the splines (and hence the pitch and the depth of the grooves) may be in the range 0.2 mm to 5 mm and are preferably in the range 0.5 mm to 1.5 mm.

The face 31 of the collector is intended to be fed with oxidant, eg. air or oxygen, while the face 32 is fed with fuel, eg. hydrogen.

The top and bottom portions 26 and 27 of the cathode face 31 of each collector are provided with grooves or hollows such as 35 which communicate with the exterior and enable the said cathode face of the collector to be supplied with oxidant and also serve to evacuate the oxidant, using a substantially rectilinear path thus avoiding head losses due to changes of direction, which head losses could be particularly large if the oxidant is air due to the very high flow rates that are necessary.

The top and bottom portions of the face 32 of each collector are provided with grooves or hollows 36 for fuel flow over the anode face of the collector from the supply orifices 28 to the exhaust orifices 28. Gas flow distribution means are provided in the said grooves or hollows 35 and 36.

These means are constituted by elongate ribs which form distribution channels with the top faces of the ribs lying in the same plane as the face of the collector in which the grooves or hollows are provided thus serving to maintain a gap between the bottom of the collector on which the ribs are formed and the adjacent components of the cell structure. The channels formed in this way are generally vertical.

It follows that since the channels delimited by the splines on the conductive portions of each collector also extend generally vertically (as shown in the figure), both the fuel and the oxidant flow in the same generally vertical direction along respective faces of the collector.

As can be seen in FIG. 12, the fuel supply orifices 28 are oblong in shape with the grooves or hollows 36 serving to guide the fuel that flows out from those portions of the said oblong orifices which are closest to the central conductive zone 24 of the collector 23. The fuel distributing ribs constitute networks fanning out from the said orifice 28 towards the conductive portion 24 of the collector. Ribs 37 situated close to the orifices 28 define first channels that feed a larger number of second or intermediate channels defined by ribs 38, said second channels being of greater length than the first channels and leading to the vicinity of the channels in the conductive portion 24 of the collector, with each second channel feeding at least one channel 34 in the conductive portion 24 of the collector.

The elongation of the fuel distribution channels makes it possible to stack large numbers of cells with low gas head losses in the channels which are common to all the cells. It also improves drainage of unwanted liquids into the bottoms of the bottom oblong channels without hindering flow of the residual fuel gas.

Figure 11:
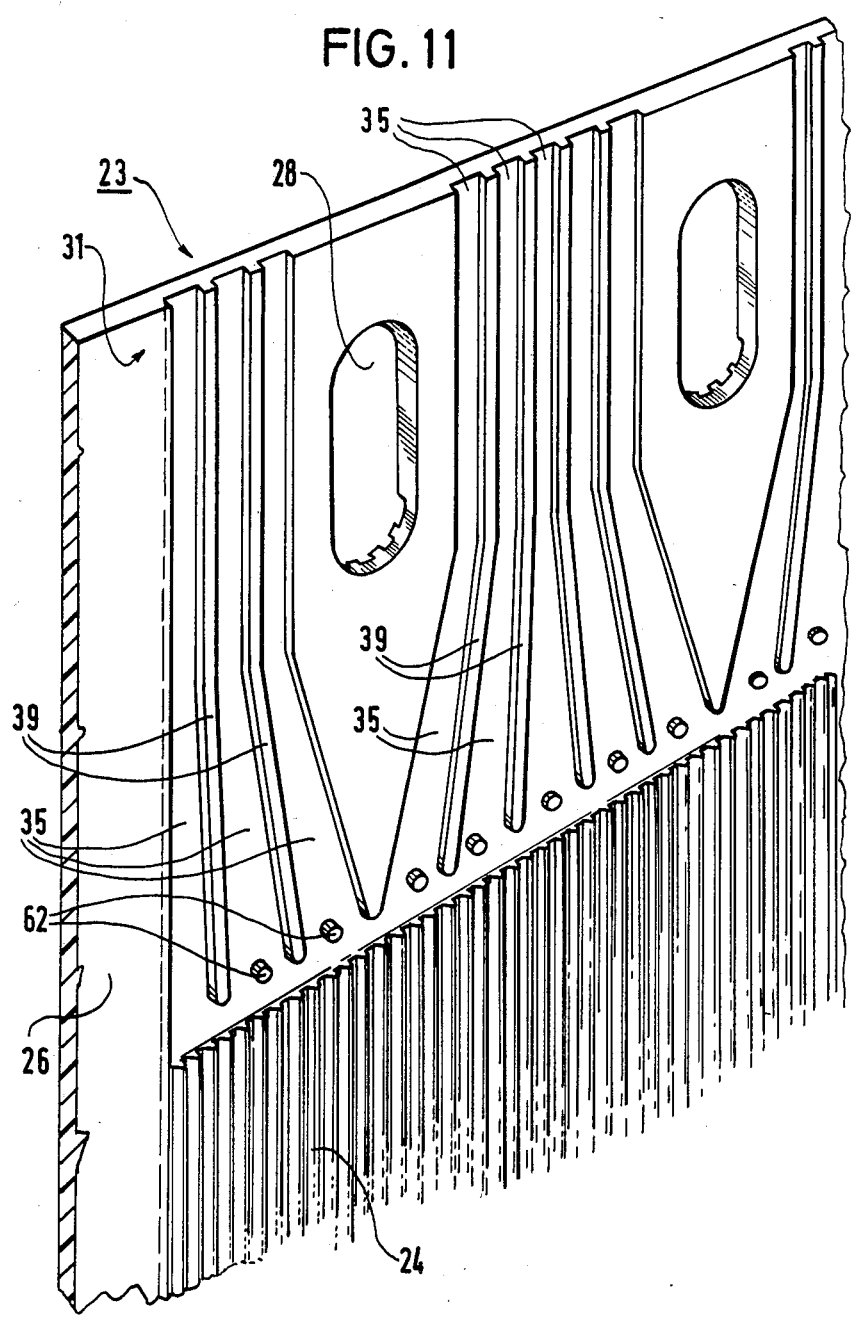
FIG. 11 is a perspective view on a larger scale of a portion or detail XI of FIG. 8.

As can be seen in FIG. 11, the ribs 39 for distributing the oxidant flow are elongate and define distribution channels which are substantially vertical on the figure and which are flared towards the conductive portion of the collector. The path of the oxidant along the cathode face of the collector is substantially rectilinear without significant change of direction without obstacles. Studs 62 may be located between the flared ends of the ribs 39 adjacent to the conductive portion 24.

Since the distribution channels open out over the entire horizontal length of the conductive portion of the collector, the oxidant is uniformly distributed over the cathode face.

For similar reasons, the fuel is uniformly distributed over the anode face.

Advantageously, the ends of the ribs 38 closest to the conductive portion 24 are superposed over the ends of the ribs 39 and the studs 62 so as to improve the positioning and fixing of these zones of the current collectors during assembly and clamping of the various components constituting the structure.

The two frames 3 and 55 together with the insulating portions of the current collectors are advantageously constituted of the same synthetic insulating material, thereby making these components easier to fix together.

These components may thus be made of polypropylene, polyethylene, polystyrene, PVC, ABS, polysulphones, . . . .

These materials may be impregnated with various substances, e.g. talc, to modify their mechanical and thermal properties, and in particular to obtain a coefficient of thermal expansion close to that of the central conductive zones of the current collectors.

By way of example, these components could be made from talc impregnated polypropylene, with 5% to 95% talc, and preferably with 35% to 45% talc.

The central conductive portions of the current collectors may advantageously be made of the same plastic material as is used for making the frame 3, but impregnated with conductive material, eg. powdered metal, graphite, carbon, oven black, or acetylene black, or fibers of carbon or graphite, or a mixture of such materials. By way of example, it may be constituted by polypropylene impregnated with 10% to 90% carbon black, and preferably with 30% to 50% carbon black.

The frame and the collectors may be made by thermocompression or by injection molding.

Injection molding is particularly advantageous for making the current collectors since the materials constituting the central conductive portion and the peripheral insulating portion can be simultaneously injected in the liquid state into the mold, thereby ensuring that the conductive and the insulating portions are welded together without any apparent discontinuity between the two zones. This technique is also very cheap.

Figure 13:
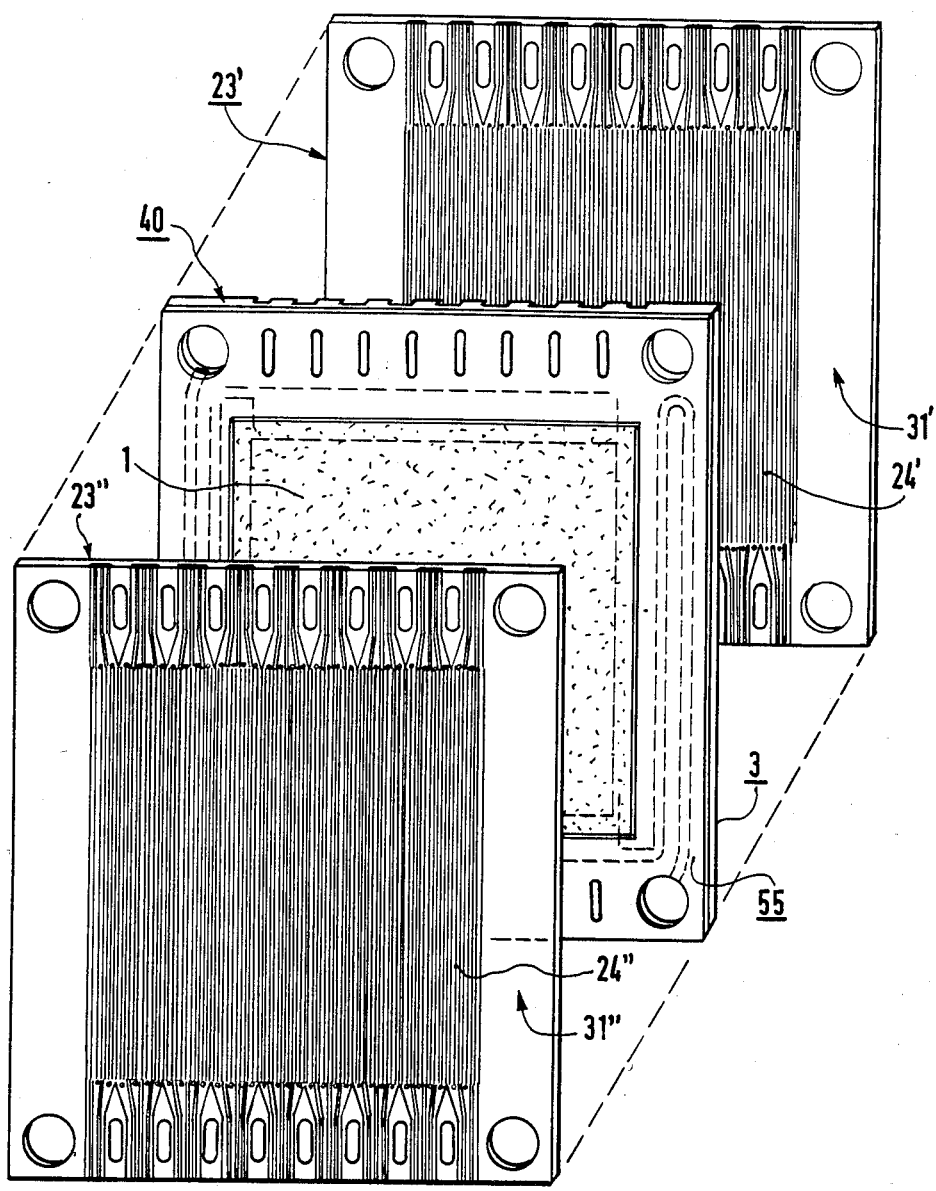
FIG. 13 is an exploded view of a cell from a cell structure in accordance with the invention.

FIG. 13 is an exploded view of a fuel cell suitable for constituting a part of a fuel cell structure in accordance with the invention.

Reference 40 designates the assembled components shown in FIG. 7 and comprises the frame 3 supporting the electrode 2 and the frame 55 supporting the electrode 1. Two current collectors of the type described above are placed on either side of this assembly. A first collector 23' has the high points of its cathode face 31' in electrical contact against the external cathode surface (hidden) and has its cathode face in electrical contact with the external anode face of an adjacent cell (not shown). A second collector 23" has the high points of its anode face (hidden) in electrical contact against the external face of the anode 1, and has its cathode face 31" in electrical contact against the cathode of the other adjacent cell (not shown).

A gas oxidant, eg. air, flows between the cathode of the assembly 40 and the cathode face 31' of the collector 23' through the channels defined by the splines present on the central conductive portion of the collector 23'.

A gas fuel, eg. hydrogen, flows between the anode 1 and the anode face of the collector 23" in the channels defined by the splines present on the central conductive portion of the collector 23".

The electrodes are electrically fixed to the current collectors along the ridges of the splines of their conductive portions by any suitable means, eg. by compression, by welding, by gluing, . . . .

However, it may be advantageous to keep the peripheral ring unfixed relative to the electrodes so as to permit differential expansion and thus avoid breaking or cracking the electrodes during assembly and during operation.

Figure 14:
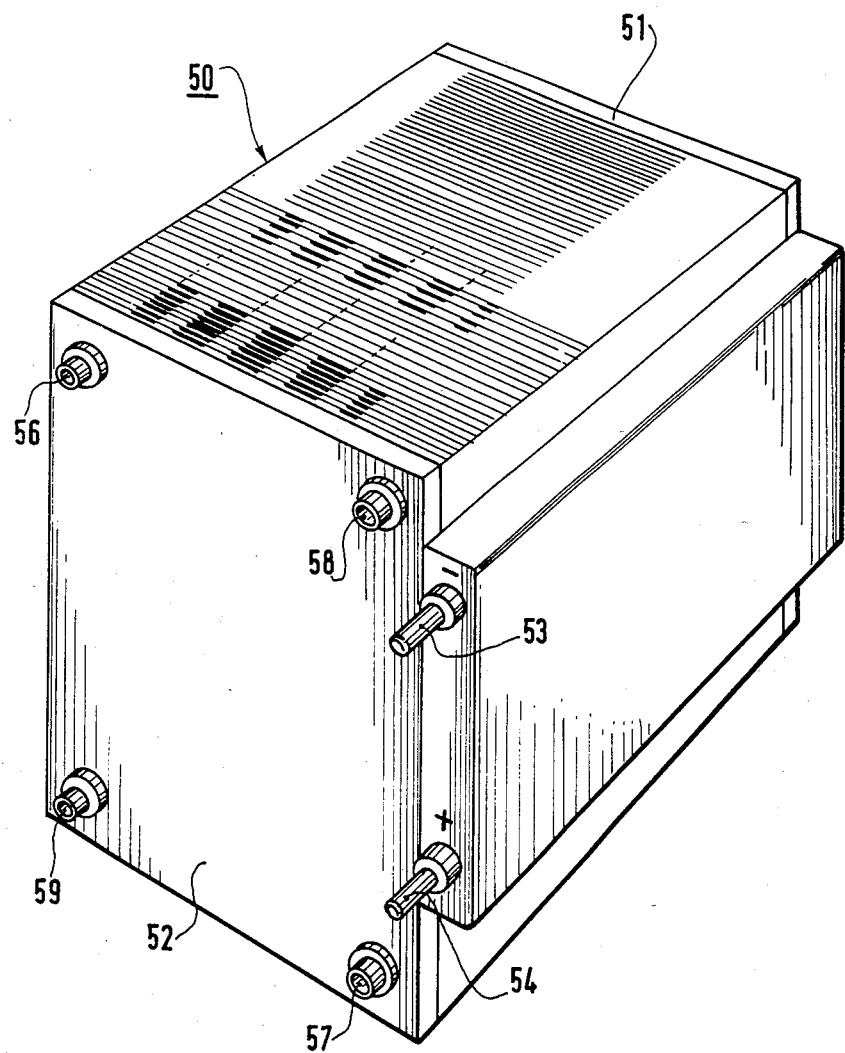
FIG. 14 is a very diagrammatic perspective view of a fuel cell structure in accordance with the invention.

FIG. 14 shows a fuel cell structure in accordance with the invention and constituted by assembling a plurality of cells of the type shown in FIG. 13.

Reference 50 designates the structure as a whole, with the end plates being designated by references 51 and 52. References 53 and 54 designate electrical terminals connected to respective end collectors which cap the ends of the stack of cells.

In one embodiment, the end collectors may be different from the bipolar collectors described above for use within the stack. The end collectors may have respective thin metal members on their faces which constitute the outside ends of the stack, said members being of at least the same surface area as the active zones of the collectors and being preferably in the form of a sheet, a grid, an expanded sheet, or a deposit, which may be applied against said face or incorporated therein.

The metal members may extend sideways for connection to respective terminals.

Orifices for admitting electrolyte to the structure and for removing therefrom are referenced 55 and 56, and references 57 and 58 designate references for fuel gas admission and evacuation.

The oxidant enters the structure through orifices which are clearly visible in the figure. These orifices are formed by juxtaposition of the notches 22 and the hollows 35 provided on the current collectors 23 and on the facing faces of the frames 3 to which the electrodes 2 are pressed.

The ribs 61 provided in the notches 22 correspond to the ribs 39 provided in the hollows 35, and these ribs co-operate by bearing against one another to maintain a the section of the bores formed by the notches 22 and the hollows 35.

We claim:

1. In a fuel cell structure constituted by a plurality of cells disposed in electrical contact with one another, each cell comprising:

first and second porous electrodes which are plane in shape with parallel faces, one being a cathode and the other an anode, and each include a specific catalyst;

an electrolyte filling the gap situated between said electrodes; and two impermeable bipolar current collectors, including at least a central conductive zone having channels on each face of said collectors, a first collector making electrical contact via the high points of its cathode face with the external surface of said cathode, and via its anode face with the external surface of the anode of an adjacent cell, and a second collector making electrical contact via the high points of its anode face with the external surface of said anode, and via its cathode face with the cathode of the other adjacent cell, said collectors having top and bottom parts situated on either side of central conductive zones, orifices provided in said top and bottom parts to allow electrolyte and fuel to flow through the cell structure, the first electrode being pressed against a first frame of insulating plastic material and having a central orifice in the shape of a quadrilateral, said frame including bottom and top portions having orifices for conveying fuel and electrolyte through the cell structure, said frame orifices corresponding to the orifices provided in the collectors, means provided on one face of said frame for conveying electrolyte from one of said electrolyte-conveying orifices acting as an inlet orifice, to an electrolyte compartment situated between the two electrodes, and from said compartment to another electrolyte-conveying orifice acting as an outlet orifice, said means including grooves that open out into hollow portions constituting electrolyte distributing and collecting manifolds disposed on the top and bottom portions of the frame along two opposite sides of the central orifice and in communication with the electrolyte chamber by means of a plurality of parallel microchannels delimited by ribs;

the improvement wherein the fuel cell structure further includes a second frame of an insulating plastic material, having the same contour as the first frame against which the first electrode is pressed and having electrolyte and fuel conveying orifices corresponding to those provided in said first frame, said second frame being applied by a plane face on the face of the first frame having the grooves and the distributing and collecting manifolds, and being fixed to said first frame in such a manner as to seal the electrolyte distribution network, the second electrode being pressed against the other face of the second frame, and the electrolyte compartment being defined by the electrodes and the central orifices of the two frames; whereby, upon supply of the fuel and electrolyte to said orifices for conveying fuel and electrolyte within said first and second frames, an oxidizing gas flows between said cathode and the cathode face of the first collector, and a fuel gas flows between said anode and the anode face of the second collector.

2. A fuel cell structure according to claim 1, wherein the face of the second frame against which the second electrode is pressed includes a set-back portion adjacent to the central orifice and of substantially the same depth as the thickness of the said second electrode whereby the said second electrode does not stand proud of the face of the second frame after being pressed thereagainst, and the face of the first frame against which the first electrode is pressed likewise includes a set-back portion adjacent to the central orifice and of substantially the same depth as the thickness of the said first electrode whereby the said first electrode does not stand proud of the face of the first frame after being pressed thereagainst.

3. A fuel cell structure according to claim 1, wherein the grooves in the first frame connecting the inlet and outlet orifices to the distributing and collecting manifolds are U-shaped, with the bottoms of the Us being situated on the opposite sides of the central electrolyte-compartment-delimiting orifice relative to the said inlet and outlet orifices.

4. A fuel cell structure according to claim 1, wherein the bottoms of the grooves and the distributing and collecting manifolds include ribs which rise to the level of the plane of the face of the frame and which serve to keep the said second frame properly spaced from the said bottoms when the frames are applied against each other.

5. A fuel cell structure according to claim 4, wherein at least one of said ribs is disposed along the entire length of the said grooves.

6. A fuel cell structure according to claim 4, wherein the distributing and collecting manifold ribs include a plurality of parallel ribs so as to avoid hindering the distribution of electrolyte top or the collection of electrolyte from said microchannels.

7. A fuel cell structure according to claim 1, wherein the current collectors comprise hollows for conveying fuel and oxidant, and ribs disposed in said hollows in such a manner as to delimit substantially vertical channels leading to the said channels on the said central conductive zones.

8. A fuel cell structure according to claim 7, further comprising studs provided between the ends of the ribs on the oxidant face of each collector adjacent to the conductive portion thereof, with the ends of the ribs on the fuel face of the same collector and adjacent to the conductive portion thereof being superposed on the ends of the oxidant face ribs or on the studs therebetween.

* * * * *